United States Patent
Stewart et al.

(10) Patent No.: US 11,741,432 B1
(45) Date of Patent: Aug. 29, 2023

(54) SYSTEMS AND METHODS FOR PREDICTIVE SCORING

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/667,698

(22) Filed: Feb. 9, 2022

(51) Int. Cl.
*G06Q 10/1053* (2023.01)
*G06N 20/00* (2019.01)
*G06Q 30/0242* (2023.01)

(52) U.S. Cl.
CPC ......... *G06Q 10/1053* (2013.01); *G06N 20/00* (2019.01); *G06Q 30/0242* (2013.01)

(58) Field of Classification Search
None
See application file for complete search history.

(56) References Cited

U.S. PATENT DOCUMENTS

| | | | |
|---|---|---|---|
| 10,891,592 B2 | 1/2021 | Grover et al. | |
| 11,023,910 B2 | 6/2021 | Raudies et al. | |
| 2011/0093307 A1 | 4/2011 | O'Keeffe | |
| 2012/0130768 A1 | 5/2012 | Rajagopal et al. | |
| 2015/0235260 A1 | 8/2015 | Wei et al. | |
| 2019/0057404 A1* | 2/2019 | Deng | G06Q 30/0202 |
| 2020/0302400 A1 | 9/2020 | Liang et al. | |
| 2021/0103861 A1 | 4/2021 | Liang et al. | |
| 2021/0357835 A1* | 11/2021 | Modi | G06F 40/194 |

FOREIGN PATENT DOCUMENTS

| | | | |
|---|---|---|---|
| CN | 113822689 A | * | 12/2021 |
| WO | 2021050053 | | 3/2021 |

OTHER PUBLICATIONS

Ramanath et al. Towards Deep and Representation Learning for Talent Search at LinkedIn. Date: Sep. 17, 2018. (Year: 2018).*
Daniel Borup & Erik Christian Montes Schutte, In Search of a Job: Forecasting Employment Growth Using Google Trends, Dec. 31, 2020.

* cited by examiner

*Primary Examiner* — Patricia H Munson
*Assistant Examiner* — Nancy N Prasad
(74) *Attorney, Agent, or Firm* — Caldwell Intellectual Property Law

(57) ABSTRACT

An apparatus for predictive scoring, the apparatus comprising a processor and a display device. The processor is configured to receive a posting query, generate a past posting datum, determine predictive metrics as a function of the posting query, and provide a score related to an expected value of a posting. The display device is configured to display a predictive score to the originator.

20 Claims, 11 Drawing Sheets

SYSTEMS AND METHODS FOR PREDICTIVE SCORING

FIELD OF THE INVENTION

The present invention generally relates to the field of human resource technology. In particular, the present invention is directed to systems and methods for predictive scoring.

BACKGROUND

Employers spend countless dollars every year posting jobs and recruiting talent. However, they often do not get insight on the metrics of their postings and previous postings. There is a need for a system and method to determine and display metrics on postings so that employers can make informed decisions on their postings.

SUMMARY OF THE DISCLOSURE

In an aspect, an apparatus for predictive scoring includes at least a processor, a memory communicatively connected to the at least a processor, the memory containing instructions configuring the at least a processor to receive a posting query from an originator, the posting query configured to generate a past posting datum, determine predictive metrics as a function of the posting query, the predictive metrics configured to provide a score related to the posting, and display the score to the originator.

In another aspect, a method for predictive scoring includes receiving, by a processer, a posting query from an employer, generating, by the processor, a past posting datum, determining, by the processor, predictive metrics as a function of the posting query, providing, by the processor, a score related to an expected value of the posting, and displaying, by the processor, the score to the originator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for predictive scoring. In an embodiment, predictive scoring may be important for employers to help determine optimal times to post jobs and find qualified applicants.

Aspects of the present disclosure can be used to score the value of a posting. Aspects of the present disclosure can also be used to analyze past postings. This is so, at least in part, because past posting datums may be stored in a database.

Aspects of the present disclosure allow for employers to determine a cost-efficiency of paying for a posting at a specific time. Exemplary embodiments illustrating aspects of the present disclosure are described below in the context of several specific examples.

Figure 1:
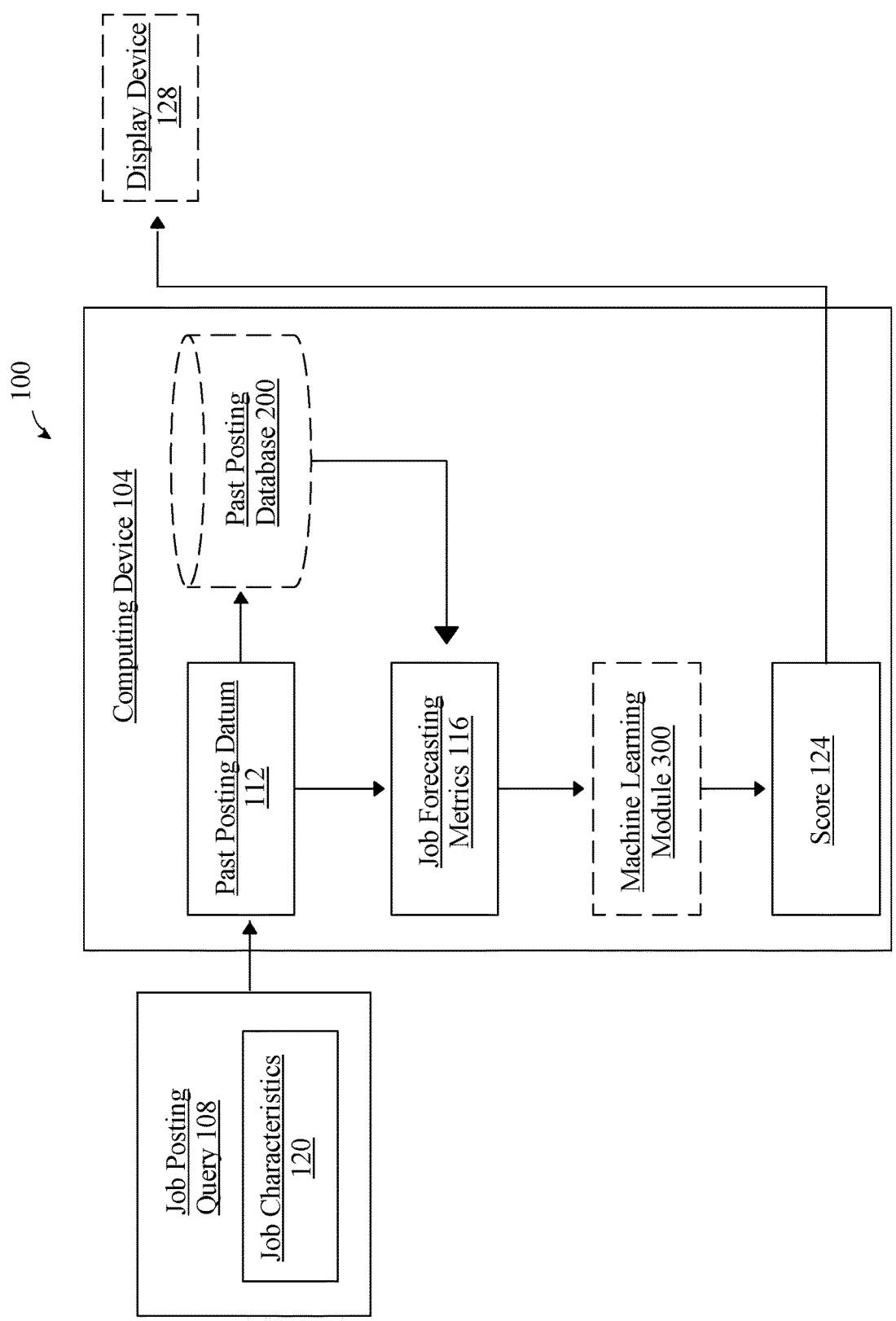
FIG. 1 is a block diagram of an embodiment of an apparatus for predictive scoring.

Referring now to FIG. 1, an exemplary embodiment of an apparatus 100 for predictive scoring is illustrated. Apparatus 100 includes a processor 104. Processor 104 may include any processor 104 as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of processor 104, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 comprises a processor 104 configured to receive a posting query 108 (also referred to as "query") from an originator. An originator may include the job poster, a staffing agency that may specialize in filling certain types of roles and/or positions, an employer, etc. An originator may be interested in job postings (also referred to as "postings") related to a job position or a job position characteristic. A "posting query", as defined herein, is a request to post a job submitted by an originator and/or job poster to processor 104. A posting query 108 comprises posting characteristics 120. As used herein, "posting characteristics" are characteristics a poster is looking for in an applicant. Exemplary embodiments of posting characteristics 120 include a job title, geographical location, employment duration, necessary education, necessary licensing, desired skills, compensation, and the like. Additionally, posting query 108 may specify a time the employer seeks to fill a posting. Time the employer seeks to fill a posting may vary from as soon as possible to several months in the future. Time may also show urgency of a posting. Originator may have an immediate urgency to fill a role. Originator also may have a posting that does not need to be filled immediately.

Continuing to reference FIG. 1, query is configured to generate a past posting datum 112. A "past posting datum", for the purposes of this disclosure, is an element of data that represents past postings. For example, a past posting datum 112 may include number of views of a posting, number of job applications received, number of qualified applications available, time took to fill role, and the like. Past posting datum 112 comprises at least a viewed compared to applied rate. A viewed compared to applied rate may be a ratio taken of the number of people who applied to a posting over the number of people who viewed a posting. Viewing a posting may comprise of clicking on the posting or spending a given amount of time on a posting. Past posting datum 112 also comprises at least a time to fill a role. Time to fill a role may start at the time of posting and end when the posting is taken down. Past posting datum 112 may be generated using a database 200 of past postings. Past posting datum 112 may be generated by identifying related past postings. Related past postings may include similar job positions posted by the same employer, or by connected employers. In an embodiment, a connected employer may include employers in the same job field as the posting employer, and the like. Similar job positions may be determined by comparison of posting titles, comparison of job descriptions, comparison of job requirements, or the like. Such comparisons may be done using classifiers. A "classifier," as used in this disclosure, is a machine-learning model, such as a mathematical model, neural net, or program generated by a machine learning algorithm known as a classification algorithm, that sorts inputs into categories or bins of data, outputting the categories or bins of data and/or labels associated therewith. In an embodiment, a classification algorithm may utilize a posting query 108 as an input and output a related past posting and the associated past posting datum 112. More details on machine learning are discussed below.

Still referring to FIG. 1, processor 104 may determine unique views of a posting. Posting may be viewed by the same user more than once, thus it may be important to distinguish unique views of a posting. Unique views of a posting may be measured using device fingerprinting. Fingerprinting a device may be performed as a function of at least a field parameter of the at least a communication. At least a field parameter may be any specific value set by a device and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of a device may include fingerprinting the device as a function of at least a machine operation parameter described in the at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of a device, a browser running on the device, or the like, or any other parameters of machine control or action available in at least a communication. In an embodiment, a plurality of such values may be assembled to identify a device and distinguish it from other devices. Unique views may also be determined by using IP geolocation of the device a user may use to access a posting.

Additionally or alternatively, unique views may be determined using user identifying information such as a username, etc. In an embodiment, a job board may ask a user for login information, including a username, password, identifier, and the like, before user gains access to job postings.

Still referring to FIG. 1, processor 104 may detect that more than one identifiers are for the same user. Processor 104 may only count one of the views of a job posting even if more than one distinct identifier of a user views the posting. More than one distinct identifier may be associated with only one user. Processor 104 may use a cryptographic accumulator linking two identifiers together for the purposes of counting views. Cryptographic accumulators are discussed in further detail in FIG. 9. User identifiers may be implemented, without limitation, as described in U.S. patent application Ser. No. 17/667,441, filed on Feb. 8, 2022, and entitled "APPARATUSES AND METHODS FOR LINKING ACTION DATA TO AN IMMUTABLE SEQUENTIAL LISTING IDENTIFIER OF A USER," the entirety of which in incorporated herein by reference.

Figure 2:
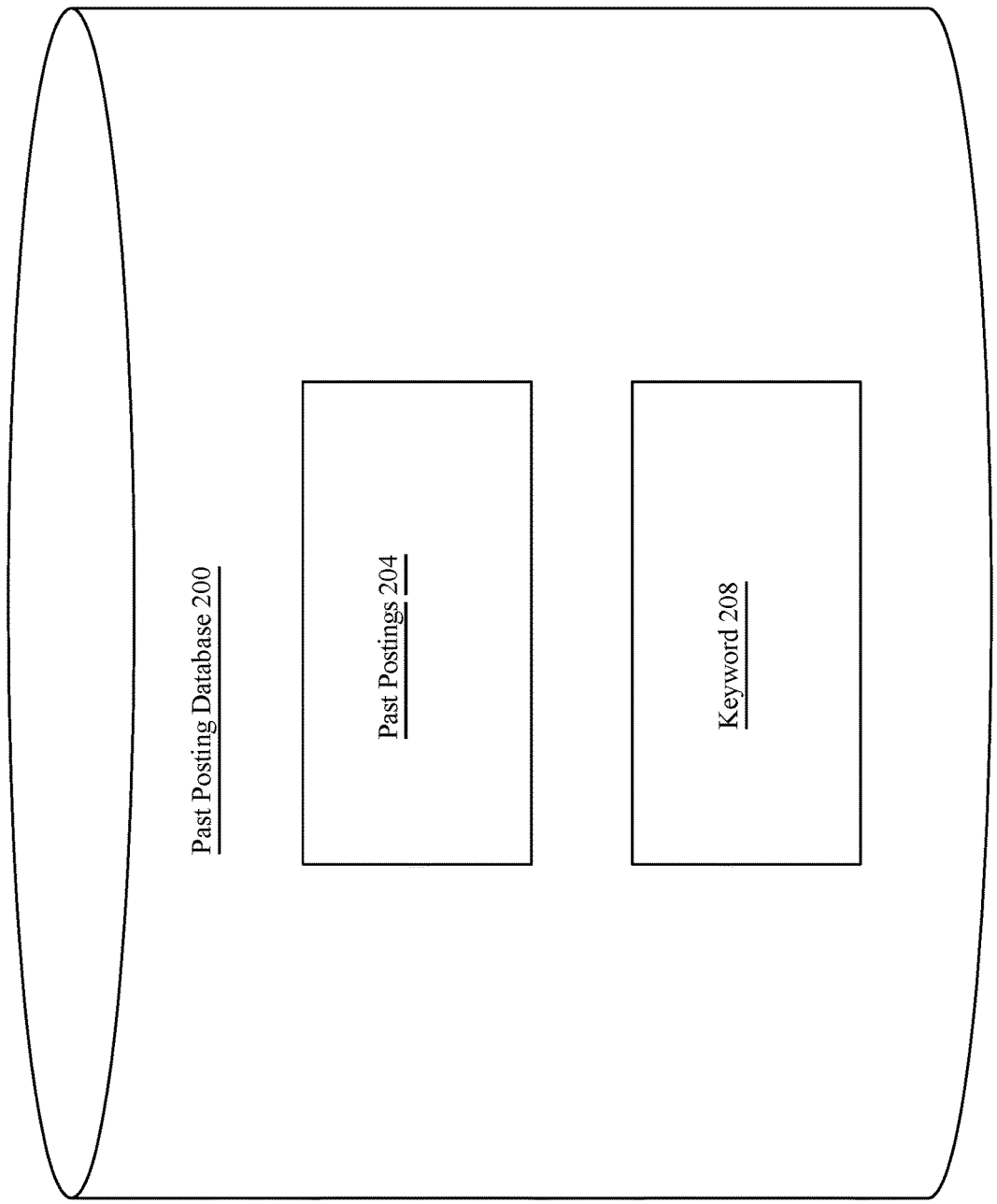
FIG. 2 is a diagrammatic representation of a past posting database.

Now referring to FIG. 2, an exemplary past posting database 200 is illustrated by way of block diagram. Past postings 204 are stored in a past posting database 200 (also referred to as "database"). Processor 104 may be communicatively connected with past posting database 200. For example, in some cases, database 200 may be local to processor 104. Alternatively or additionally, in some cases, database 200 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud", e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Network may use an immutable sequential listing to securely store database 200. Additionally or alternatively, each past posting, metrics thereof, etc. may be stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Immutable sequential listings are discussed in further detail in FIG. 8.

Continuing to reference FIG. 2, database 200 may store a plurality of past postings 204. Past posting datum/datums may be generated using the past posting database 200. As used in this disclosure, "past posting database" is a data structure configured to store data associated with a plurality of past postings 204. Database 200 may comprise of past postings 204 from the same employer or from connected employers. Database 200 may comprise of all postings from a job board or a job aggregator website. Past postings 204 may be uploaded to past posting database from at least a remote device. A "remote device," as used in this disclosure, is a computing device, including but not limited to a mobile device such as a smartphone, tablet, laptop, desktop, and the like. Past posting database 200 may comprise of past postings 204 in their entirety or of past posting keyword 208. As used in this disclosure, a "keyword" is any meaningful word or syntax. For example without limitation, a keyword 208 may be "mechanical engineer" in the instance that a posting is looking for a mechanical engineer. In another nonlimiting example, a keyword 208 may be "remote" in an example where the posting is a remote job. Database 200 may be implemented, without limitation, as a relational database, a key-value retrieval datastore such as a NOSQL database, or any other format or structure for use as a datastore that a person skilled in the art would recognize as suitable upon review of the entirety of this disclosure.

Now referring back to FIG. 1, apparatus 100 comprises of predictive scoring metrics 116. Predictive metrics 116 are determined as a function of the posting query 108. Predictive metrics 116 comprises a plurality of metrics. A "metric", as used herein, is a measure of quantitative assessment used for tracking postings. As used herein, a "predictive metric" is a metric used to forecast outcomes of a posting. Predictive metrics 116 may be derived from the past post datum 112. For example and without limitation, metrics for predictive scoring may include number of views of similar past postings, distinct qualified applicants, expected compensation by similar applications, number of applications received by similar past postings, similar postings and their corresponding traffic (such as clicks and/or views), number of identified qualified applicants who may fill the potential role, and the like. Numerical metrics, such as number of views, expected compensation, number of applications, clicks, views, and the like may be presented as a mean, median, and/or mode. For example, number of views of similar past postings may be a mean, median, and/or mode of number of views stored for past postings in the database 200.

With continued reference to FIG. 1, predictive scoring metric provides a score 124 related to an expected value of the posting. For example, score 124 may be a rating from 1-10 wherein 1 is a bad value and 10 is a good value. Additionally or alternatively, score 124 may be color coded in red and green, where a red score is a bad value posting and a green score is a good value posting. As used herein, an "expected value" of a posting is how cost-efficient a job is. For example, a good value posting is cost-efficient, whereas a bad value posting is not cost-efficient. As used herein, "cost-efficient" refers to postings wherein the benefit of posting a job outweighs the cost. For example, benefits of posting a job may include hiring an applicant in a given time frame. A cost of a posting may include the cost for posting a posting. In an embodiment, a not cost-efficient posting may include a posting listed at a time that has previously shown to have a low number of applicants. In this case, for example, an employer may wait to post a posting. Predictive scoring metric may educate employers on the cost-efficiency of paying for a posting at a given time. Predictive scoring metric may determine efficiency for a posting. In another embodiment, predictive scoring metric may determine the time efficiency for a posting. As used herein, "time-efficient" refers to a posting wherein the posting performs in the best possible manner with the least amount of wasted time. In an embodiment, a time-efficient posting may refer to a posting for a ski instructor posted in September rather than March. In this embodiment, the ski instructor posting would have less wasted time on the job board in September than in March, as skiing season is predominantly in the winter and not the summer.

Continuing to refer to FIG. 1, score 124 may be determined using various models. A model to determine a score 124 for a posting may use known parameters for inputs and then calculate the efficiency score. Known parameters may include any predictive metrics 116 mentioned above. Score 124 may include a computer-generated number that may be associated with the cost-benefit of a posting. Model may score more than one posting and output a list showing the scorings. List of scores may be used to prioritize postings that may be filled quicker. For example and without limitation, if employer has two postings, job one and job two, and job two has a higher score for the given time frame, job two may be given the priority posting. This may be the case since job two may have a better chance of being filled. Processor 104 may be configured to utilize a machine learning model that is trained as a score calculator.

With continued reference to FIG. 1, predictive metrics 116 utilize a machine-learning module as described below in FIG. 4. Cost-benefit analysis may be performed using a machine-learning module. Machine-learning module 120 may be trained using training data. Training data may be made up of a plurality of training examples that each include examples of data to be inputted into the machine-learning module 120 (such as type of posting, time of posting, location of posting, etc.) and examples of data to be output therefrom (such as past posting data, etc.). Training data may be implemented in any manner described below. Training data may be obtained from and/or in the form of previous postings in database 200. Machine-learning module may use a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum 112 that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 200, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 3:
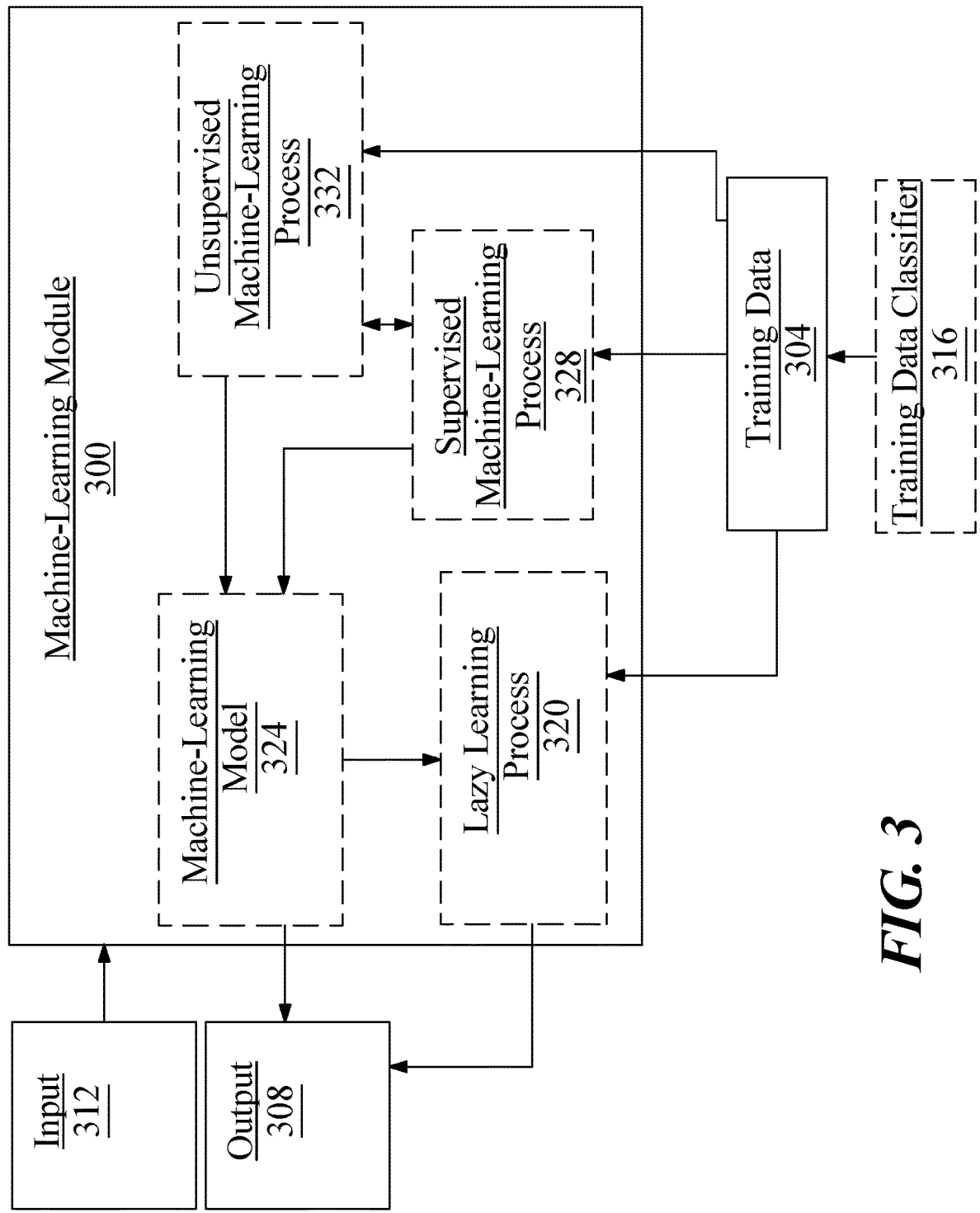
FIG. 3 is a block diagram of exemplary machine-learning processes.

Referring now to FIG. 3, an exemplary embodiment of a machine learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a processor 104/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine learning module 300 may correlate any input data as described in this disclosure to any output data as described in this disclosure. As a non-limiting illustrative inputs may include subject-specific data and outputs may include description-specific data.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum 112 that labels or otherwise identifies a set of data that are clustered together, found to be close under a distance metric as described below, or the like. Machine learning module 300 may generate a classifier using a classification algorithm, defined as a process whereby a processor 104 and/or any module and/or component operating thereon derives a classifier from training data 304. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to according to fields of job description for instance, title, role, organization, requisite experience, requisite credentials, and the like.

Still referring to FIG. 3, machine learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum 112. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
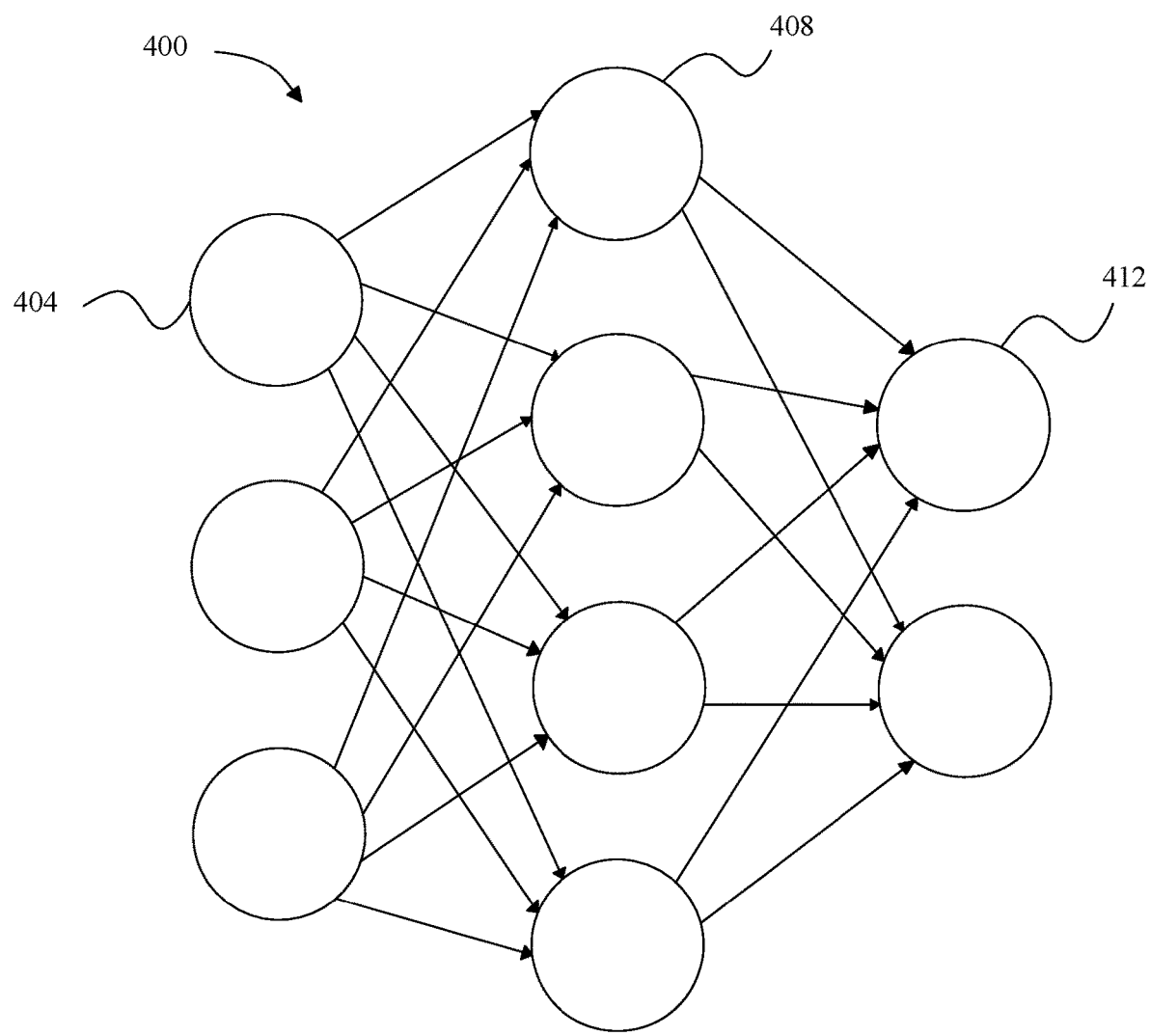
FIG. 4 illustrates an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
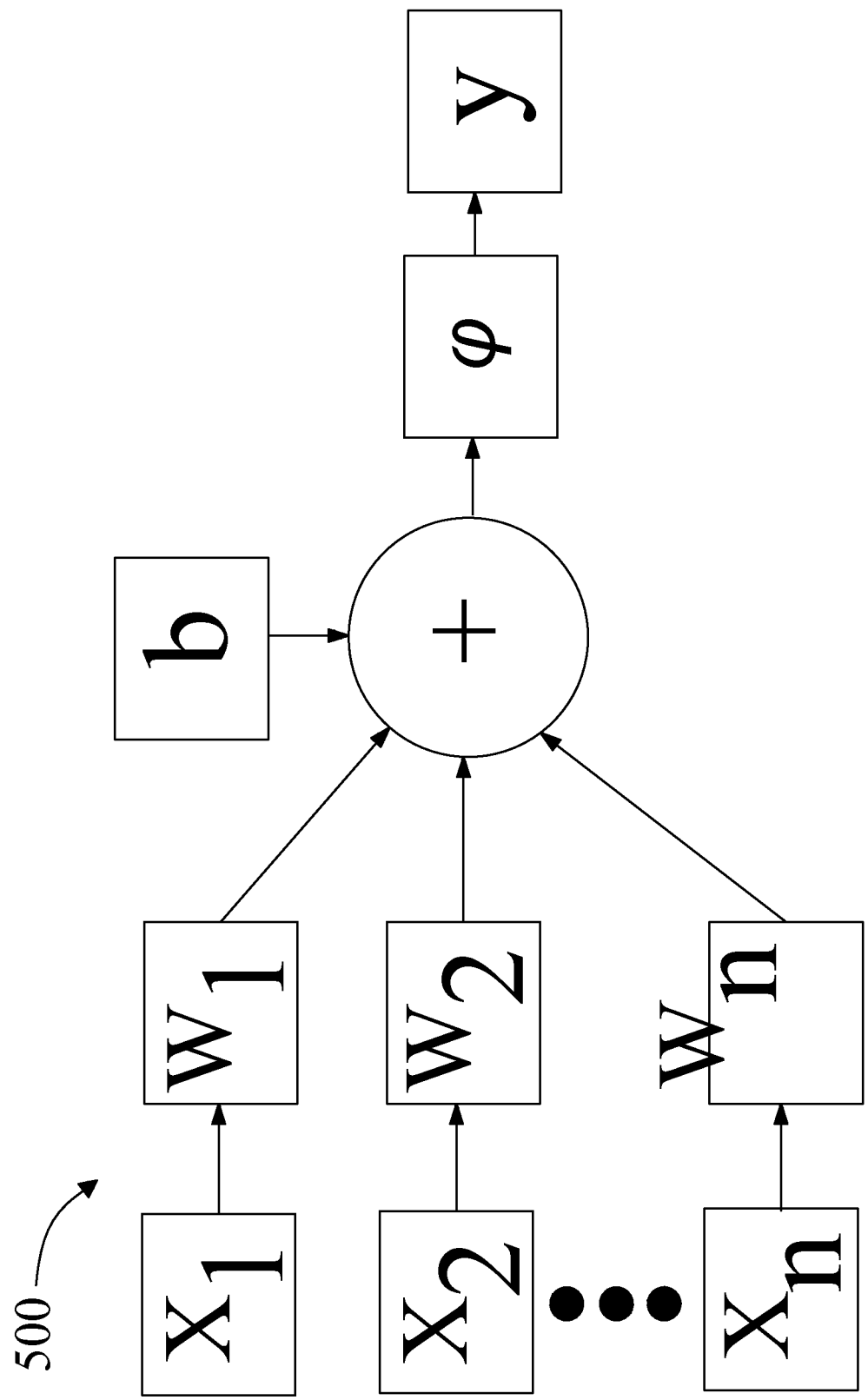
FIG. 5 is a block diagram of an exemplary node.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
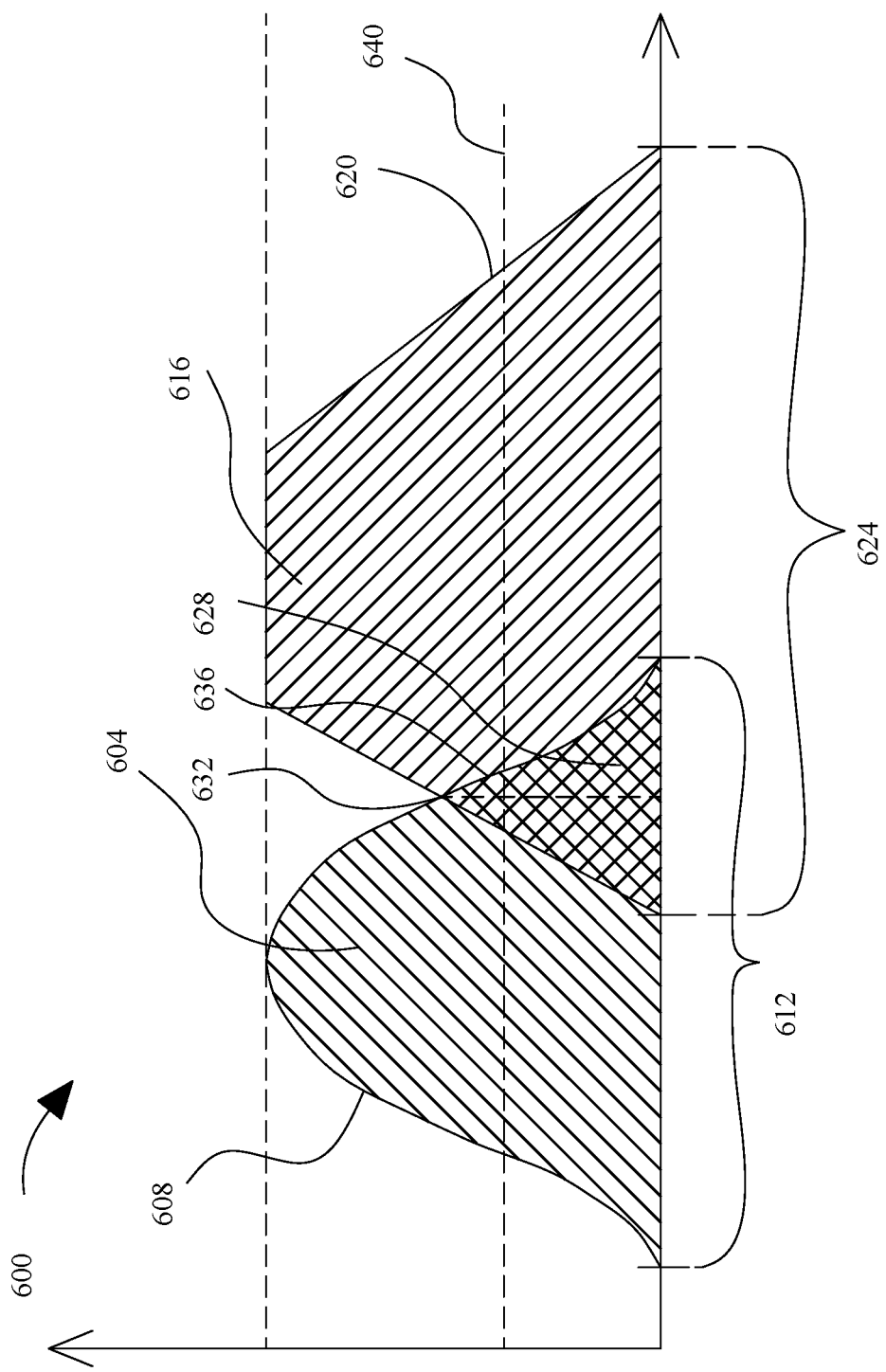
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with comparison 180 in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent compatibility threshold 176 and its ranges from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or output posting variables. For instance, a posting variable may represent a first measurable value pertaining to views of posting such as whether the posting gathered views as a function of the time of posting. Continuing the example, an output variable may represent the score 124. An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, past posting may indicate a sufficient degree of overlap with the posting query 108 for combination to occur as described above. There may be multiple thresholds; for instance, a second threshold may indicate a sufficient match for purposes of past posting datum 112 and posting query 108 as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Referring back to FIG. 1, processor 104 may automatically publish postings when provided score 124 is within a predetermined threshold. Postings may be posted on any job board and/or job aggregator website specified by an employer. For instance and without limitation, if score 124 of a posting is between a 6 and 10 (using the scoring system in a previous example), then the processor 104 may publish said posting. As used in this disclosure, a "predetermined threshold" is a limit and/or range of an acceptable quantitative value and/or combination of values such as an n-tuple or function such as linear function of values, and/or representation related to the scoring of a posting. Predetermined threshold may be determined by the employer or user of apparatus 100. Additionally or alternatively, predetermined threshold may be determined by processor 104 using a machine learning module 300.

Figure 7:
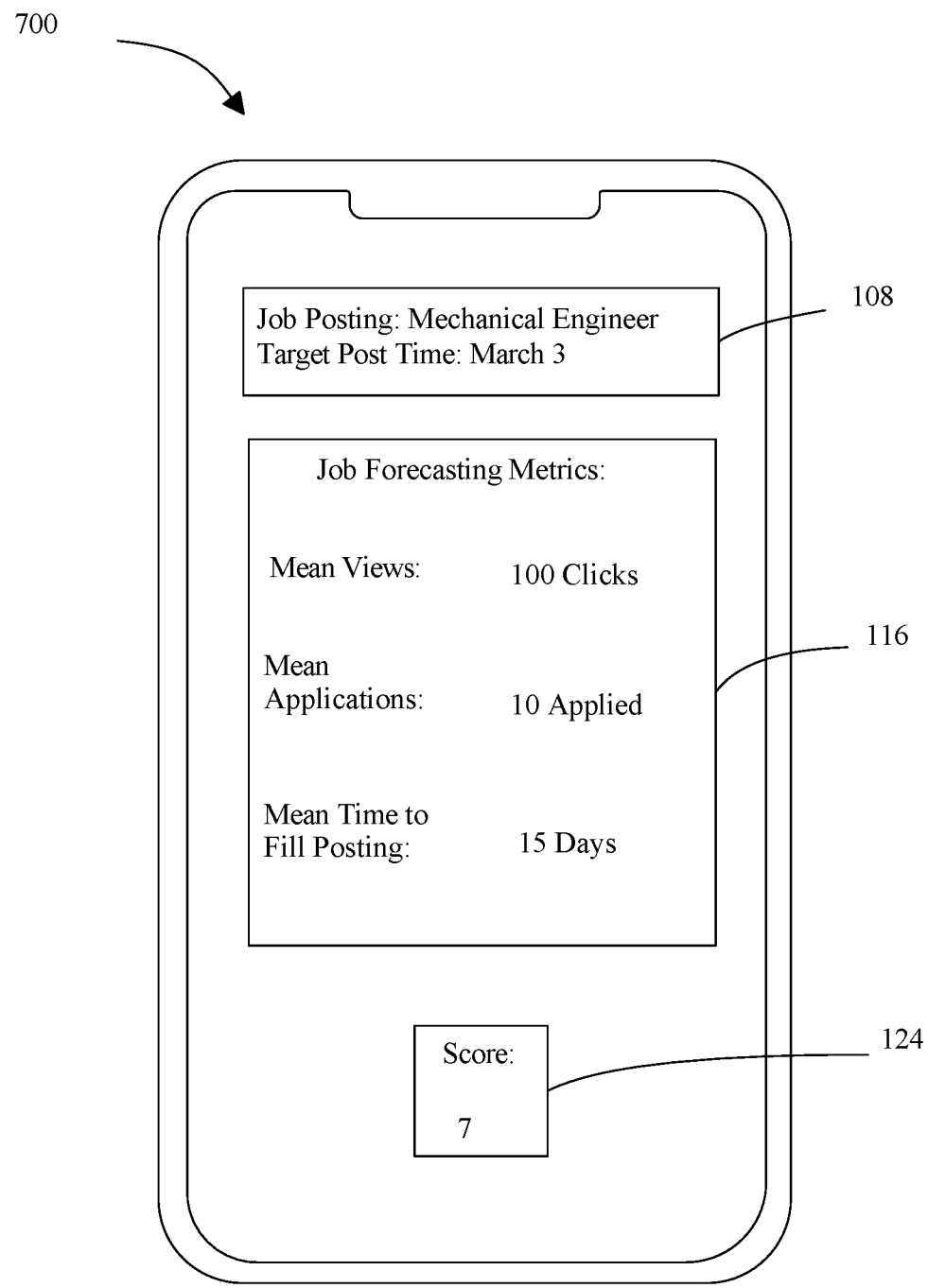
FIG. 7 is diagrammatic representation of an exemplary embodiment of a display device.

With continued reference to FIG. 1, predictive scoring metric is displayed to the employer. Predictive scoring metric is displayed using a graphic user interface (GUI). Alternatively or additionally, score 124 may be displayed using a GUI. GUI may include a plurality of lines, images, symbols, etc. as illustrated in FIG. 7. GUI may be displayed on a display device 128. Display device 128 may include, but is not limited to, a smartphone, tablet, laptop, monitor, tablet, and the like. Display device 128 may include a separate device that includes a transparent screen configured to display computer generated images and/or information. The employer may view the information displayed on the display device 128 in real time.

Now referring to FIG. 7, a diagrammatic representation of an exemplary embodiment of a display device 128. Display device 128 may be communicatively connected to the processor 104. In some embodiments, processor 104 may be configured to display predictive metrics 116 on display device 128. Predictive metrics 116 may include any of the aforementioned metrics. In other embodiments, display device 128 may be configured to display score 124 calculated. In some embodiments, display device 128 may be configured to display a color code for the score 124. A "color code", as used in this disclosure, is any color that displays score 124 in terms of cost-efficiency.

Figure 8:
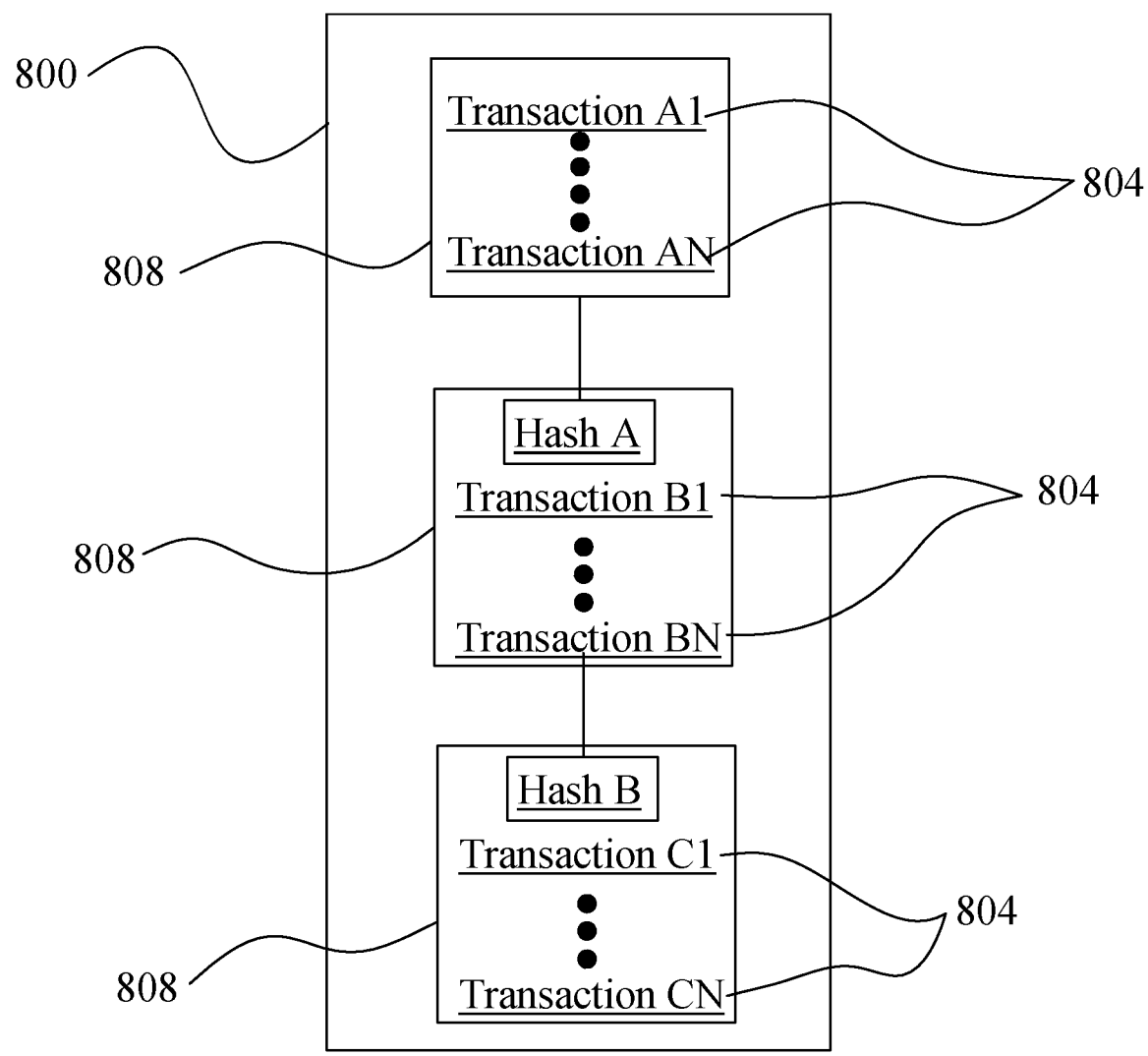
FIG. 8 is a diagram of an immutable sequential listing.

Referring now to FIG. 8, an exemplary embodiment of an immutable sequential listing 800 is illustrated. Data elements are listing in immutable sequential listing 800; data elements may include any form of data, including textual data, image data, encrypted data, cryptographically hashed data, and the like. Data elements may include, without limitation, one or more at least a digitally signed assertions. In one embodiment, a digitally signed assertion 804 is a collection of textual data signed using a secure proof as described in further detail above; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 804. In an embodiment, collection of textual data states that the owner of a certain transferable item represented in a digitally signed assertion 804 register is transferring that item to the owner of an address. A digitally signed assertion 804 may be signed by a digital signature created using the private key associated with the owner's public key, as described above.

Still referring to FIG. 8, a digitally signed assertion 804 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 804 may describe the transfer of a physical good; for instance, a digitally signed assertion 804 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 804 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 8, in one embodiment, an address is a textual datum identifying the recipient of virtual currency or another item of value in a digitally signed assertion 804. In some embodiments, address is linked to a public key, the corresponding private key of which is owned by the recipient of a digitally signed assertion 804. For instance, address may be the public key. Address may be a representation, such as a hash, of the public key. Address may be linked to the public key in memory of a processor 104, for instance via a "wallet shortener" protocol. Where address is linked to a public key, a transferee in a digitally signed assertion 804 may record a subsequent a digitally signed assertion 804 transferring some or all of the value transferred in the first a digitally signed assertion 804 to a new address in the same manner. A digitally signed assertion 804 may contain textual information that is not a transfer of some item of value in addition to, or as an alternative to, such a transfer. For instance, as described in further detail below, a digitally signed assertion 804 may indicate a confidence level associated with a distributed storage node as described in further detail below.

In an embodiment, and still referring to FIG. 8 immutable sequential listing 800 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 800 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 8, immutable sequential listing 800 may preserve the order in which the at least a posted content took place by listing them in chronological order; alternatively or additionally, immutable sequential listing 800 may organize digitally signed assertions 804 into sub-listings 808 such as "blocks" in a blockchain, which may be themselves collected in a temporally sequential order; digitally signed assertions 804 within a sub-listing 808 may or may not be temporally sequential. The ledger may preserve the order in which at least a posted content took place by listing them in sub-listings 808 and placing the sub-listings 808 in chronological order. The immutable sequential listing 800 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 800 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 10161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 8, immutable sequential listing 800, once formed, may be inalterable by any party, no matter what access rights that party possesses. For instance, immutable sequential listing 800 may include a hash chain, in which data is added during a successive hashing process to ensure non-repudiation. Immutable sequential listing 800 may include a block chain. In one embodiment, a block chain is immutable sequential listing 800 that records one or more new at least a posted content in a data item known as a sub-listing 808 or "block." An example of a block chain is the BITCOIN block chain used to record BITCOIN transactions and values. Sub-listings 808 may be created in a way that places the sub-listings 808 in chronological order and link each sub-listing 808 to a previous sub-listing 808 in the chronological order so that any processor 104 may traverse the sub-listings 808 in reverse chronological order to verify any at least a posted content listed in the block chain. Each new sub-listing 808 may be required to contain a cryptographic hash describing the previous sub-listing 808. In some embodiments, the block chain contains a single first sub-listing 808 sometimes known as a "genesis block."

Still referring to FIG. 8, the creation of a new sub-listing 808 may be computationally expensive; for instance, the creation of a new sub-listing 808 may be designed by a "proof of work" protocol accepted by all participants in forming the immutable sequential listing 800 to take a powerful set of computing devices a certain period of time to produce. Where one sub-listing 808 takes less time for a given set of computing devices to produce the sub-listing 808 protocol may adjust the algorithm to produce the next sub-listing 808 so that it will require more steps; where one sub-listing 808 takes more time for a given set of computing devices to produce the sub-listing 808 protocol may adjust the algorithm to produce the next sub-listing 808 so that it will require fewer steps. As an example, protocol may require a new sub-listing 808 to contain a cryptographic hash describing its contents; the cryptographic hash may be required to satisfy a mathematical condition, achieved by having the sub-listing 808 contain a number, called a nonce, whose value is determined after the fact by the discovery of the hash that satisfies the mathematical condition. Continuing the example, the protocol may be able to adjust the mathematical condition so that the discovery of the hash describing a sub-listing 808 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 808 according to the protocol is known as "mining." The creation of a new sub-listing 808 may be designed by a "proof of stake" protocol as will be apparent to those skilled in the art upon reviewing the entirety of this disclosure.

Continuing to refer to FIG. 8, in some embodiments, protocol also creates an incentive to mine new sub-listings 808. The incentive may be financial; for instance, successfully mining a new sub-listing 808 may result in the person or entity that mines the sub-listing 808 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 808 Each sub-listing 808 created in immutable sequential listing 800 may contain a record or at least a posted content describing one or more addresses that receive an incentive, such as virtual currency, as the result of successfully mining the sub-listing 808.

With continued reference to FIG. 8, where two entities simultaneously create new sub-listings 808, immutable sequential listing 800 may develop a fork; protocol may determine which of the two alternate branches in the fork is the valid new portion of the immutable sequential listing 800 by evaluating, after a certain amount of time has passed, which branch is longer. "Length" may be measured according to the number of sub-listings 808 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 808 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 800 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 800.

Still referring to FIG. 8, additional data linked to at least a posted content may be incorporated in sub-listings 808 in the immutable sequential listing 800; for instance, data may be incorporated in one or more fields recognized by block chain protocols that permit a person or computer forming a at least a posted content to insert additional data in the immutable sequential listing 800. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third-party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 8, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 808 in a block chain computationally challenging; the incentive for producing sub-listings 808 may include the grant of new crypto-currency to the miners. Quantities of crypto-currency may be exchanged using at least a posted content as described above.

Figure 9:
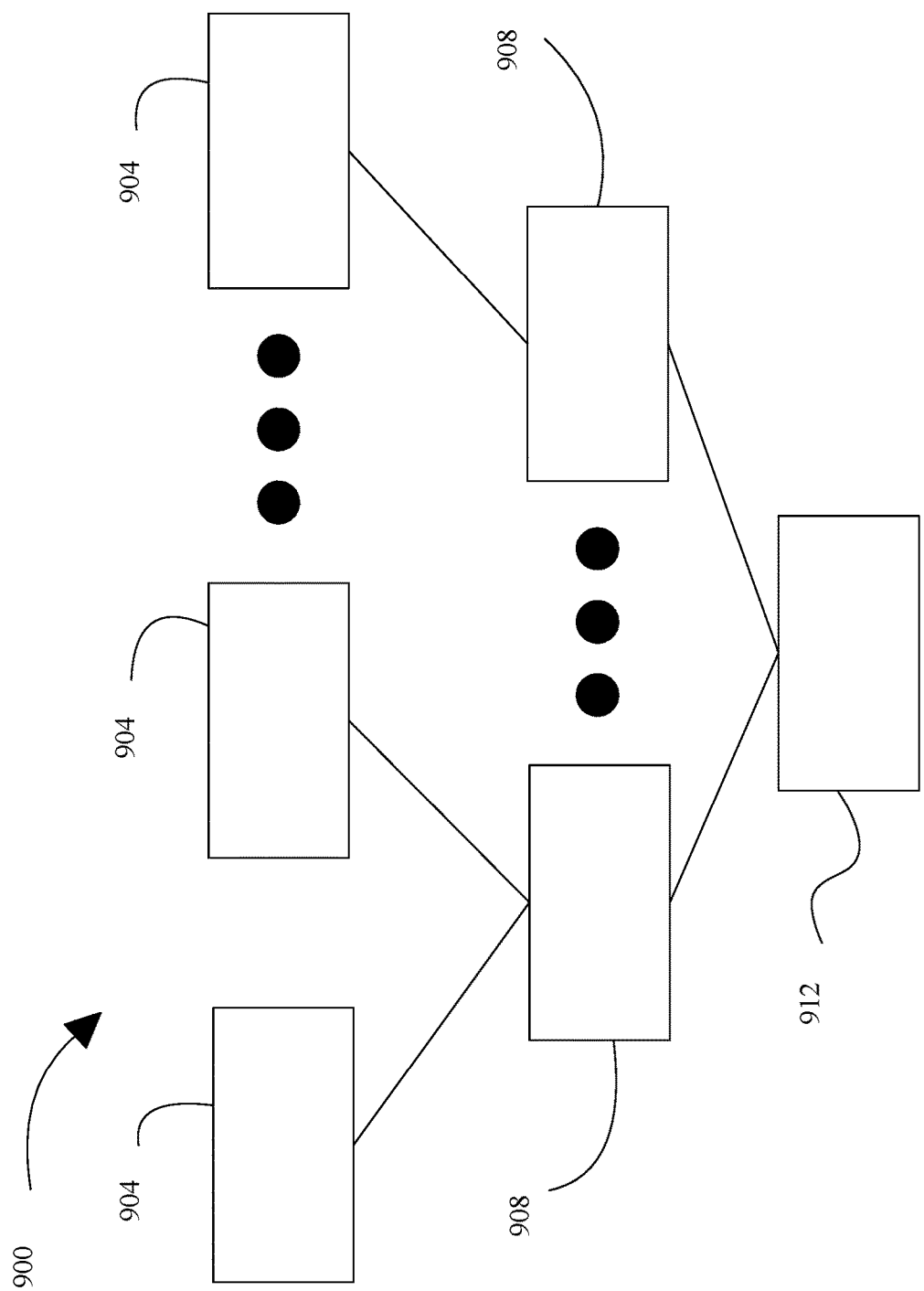
FIG. 9 is a block diagram illustrating an exemplary embodiment of a cryptographic accumulator.

Turning now to FIG. 9, an exemplary embodiment of a cryptographic accumulator 900 is illustrated. Cryptographic accumulator 900 has a plurality of accumulated elements 904, each accumulated element 904 generated from a lot of the plurality of data lots. Accumulated elements 904 are create using an encryption process, defined for this purpose as a process that renders the lots of data unintelligible from the accumulated elements 904; this may be a one-way process such as a cryptographic hashing process and/or a reversible process such as encryption. Cryptographic accumulator 900 further includes structures and/or processes for conversion of accumulated elements 904 to root 919 element. For instance, and as illustrated for exemplary purposes in FIG. 9, cryptographic accumulator 900 may be implemented as a Merkle tree and/or hash tree, in which each accumulated element 904 created by cryptographically hashing a lot of data. Two or more accumulated elements 904 may be hashed together in a further cryptographic hashing process to produce a node 908 element; a plurality of node 908 elements may be hashed together to form parent nodes 908, and ultimately a set of nodes 908 may be combined and cryptographically hashed to form root 919. Contents of root 919 may thus be determined by contents of nodes 908 used to generate root 919, and consequently by contents of accumulated elements 904, which are determined by contents of lots used to generate accumulated elements 904. As a result of collision resistance and avalanche effects of hashing algorithms, any change in any lot, accumulated element 904, and/or node 908 is virtually certain to cause a change in root 919; thus, it may be computationally infeasible to modify any element of Merkle and/or hash tree without the modification being detectable as generating a different root 919. In an embodiment, any accumulated element 904 and/or all intervening nodes 908 between accumulated element 904 and root 919 may be made available without revealing anything about a lot of data used to generate accumulated element 904; lot of data may be kept secret and/or demonstrated with a secure proof as described below, preventing any unauthorized party from acquiring data in lot.

Alternatively or additionally, and still referring to FIG. 9, cryptographic accumulator 900 may include a "vector commitment" which may act as an accumulator in which an order of elements in set is preserved in its root 919 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 900 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 10:
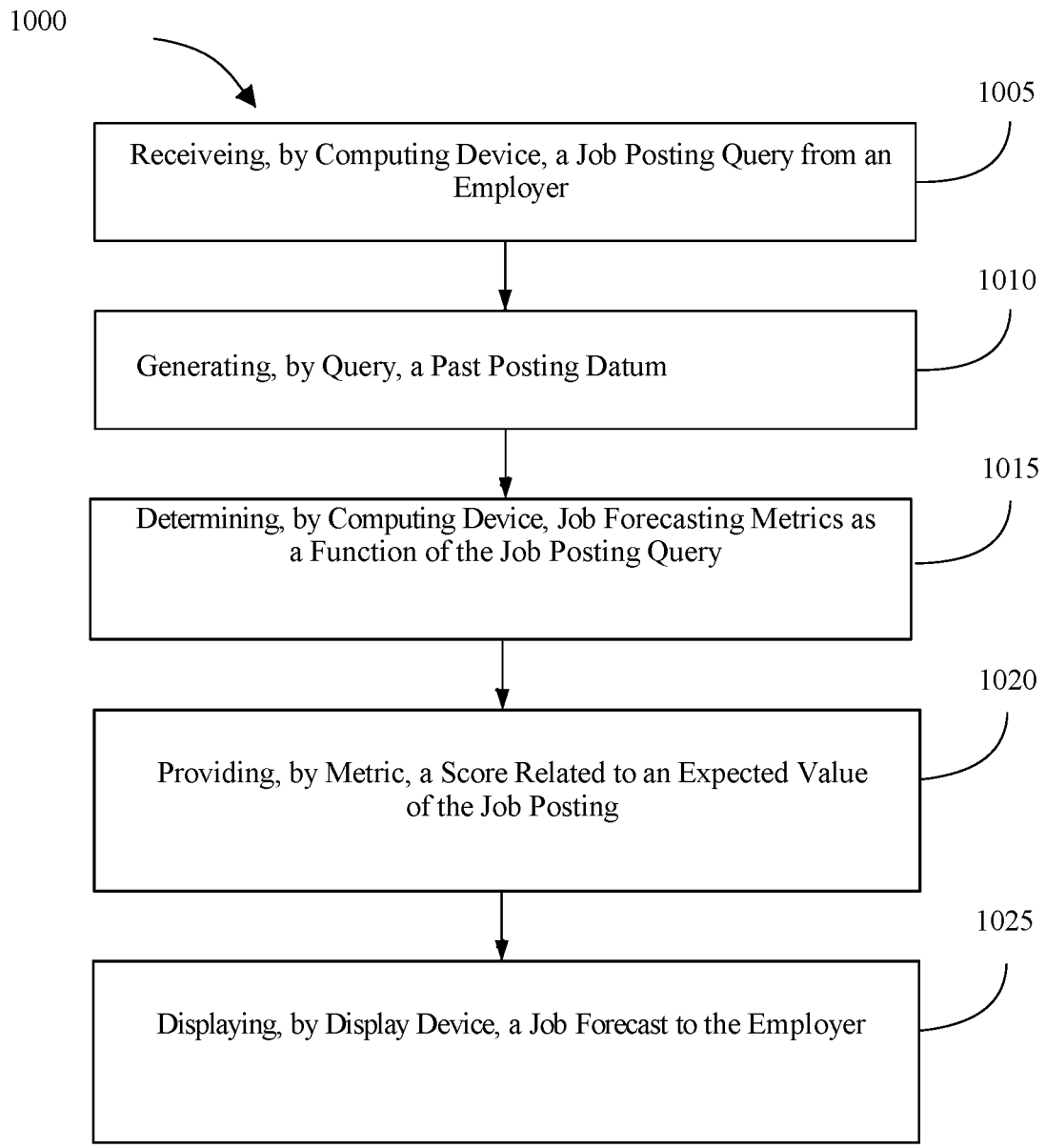
FIG. 10 is a flow diagram of an exemplary method for predictive scoring.

Now referring to FIG. 10, a method 1000 of forecasting jobs is presented. At step 1005, method 1000 includes receiving, by processor 104, a posting query 108 from an employer. A posting query 108 may include a request to list a posting at a given time. This step may be implemented as described above, without limitation, in FIGS. 1-9.

Still referring to FIG. 10, at step 1010, method 1000 includes generating, by query 108, a past posting datum 112. Past posting datum 112 may include data from past postings 204 that may be related to the posting query 108. Past posting datum 112 may be stored in a database 200. This step may be implemented as described above, without limitation, in FIGS. 1-9.

Still referring to FIG. 10, at step 1015, method 1000 includes determining, by processor 104, predictive metrics 116 as a function of the posting query 108. Predictive metrics 116 may be determined using past posting datum 112. This step may be implemented as described above, without limitation, in FIGS. 1-9.

Still referring to FIG. 10, at step 1020, method 1000 includes providing, by metric, a score 124 related to an expected value of the posting. Predictive metrics 116 may include a score 124 that may inform the employer of the cost-efficiency of a posting. This step may be implemented as described above, without limitation, in FIGS. 1-9.

Still referring to FIG. 10, at step 1025, method 1000 includes displaying, by display device 128, a job forecast to the employer. Display device 128 may comprise a GUI. Display device 128 may include, but is not limited to, a smartphone, tablet, laptop, monitor, tablet, and the like. This step may be implemented as described above, without limitation, in FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
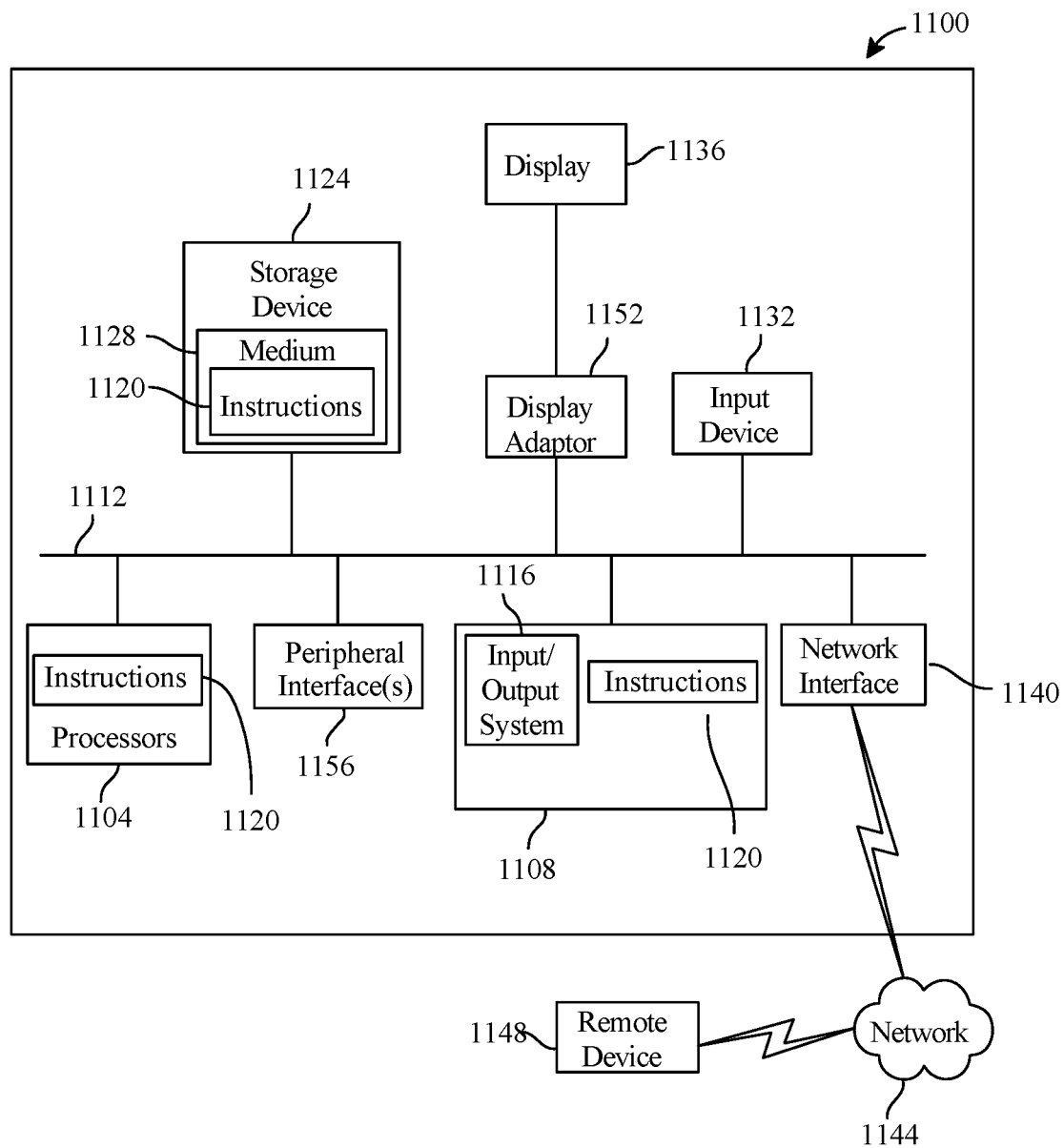
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for predictive scoring, the apparatus comprising:
    at least a processor;
    a memory communicatively connected to the at least a processor, the memory containing instructions configuring the at least a processor to:
        receive a first posting query relating to a first posting and a second posting query relating to a second posting from an originator;
        generate a first past posting datum, wherein generation of the first past posting datum comprises:
            receive, from an immutable sequential listing, a first past posting, wherein the immutable sequential listing comprises at least a blockchain; and
            generating the first past posting datum as a function of the first posting query and the first past posting;
        generate a second past posting datum, wherein generation of the second past posting datum comprises:
            receiving, from the immutable sequential listing, a second past posting; and
            generating a second past posting datum as a function of the second posting query and the second past posting;
        determine first predictive metrics as a function of the first past posting datum and second predictive metrics as a function of the second past posting datum;
        generate a first score related to the first posting as a function of the first predictive metrics and a second score related to the second posting as a function of the second predictive metrics, wherein generating the first score and the second score comprises:
            training a machine learning model using training data and a machine learning algorithm, wherein the training data correlates previous posting metrics to scores;
            outputting the first score using the trained machine learning model, wherein the first predictive metrics are provided to the trained machine learning model as an input to output the first score; and
            outputting the second score using the trained machine learning model, wherein the second predictive metrics are provided to the trained machine learning model as an input to output the second score;
        display the first score and the second score to the originator;
        prioritize publishing of one of the first posting and the second posting based on a comparison of the first score and the second score; and
        publish, automatically, the prioritized posting when the score of the prioritized posting is within a predetermined threshold.

2. The apparatus of claim 1, wherein each posting query comprises posting characteristics.

3. The apparatus of claim 1, wherein each posting query specifies a time the originator seeks to fill a posting.

4. The apparatus of claim 1, wherein each past posting datum comprises at least an accessed compared to applied rate.

5. The apparatus of claim 1, wherein each past posting datum comprises at least a time to fill a role.

6. The apparatus of claim 1, wherein the past postings are stored in a database.

7. The apparatus of claim 1, wherein each score determines an efficiency for a posting.

8. The apparatus of claim 1, wherein the predictive metrics are displayed using a graphic user interface.

9. A method for predictive scoring, the method comprising:
- receiving, by a processer, a first posting query relating to a first posting and a second posting query relating to a second posting from an originator;
- generating, by the processor, a first past posting datum, wherein generation of the first past posting datum comprises:
  - receive from an immutable sequential listing a first past posting, wherein the immutable sequential listing comprises at least a blockchain; and
  - generating the first past posting datum as a function of the first posting query and the first past posting;
- generating, by the processor, a second past posting datum, wherein generation of the second past posting datum comprises:
  - receiving from the immutable sequential listing a second past posting; and
  - generating a second past posting datum as a function of the second posting query and the second past posting;
- determining, by the processor, first predictive metrics as a function of the first past posting datum and second predictive metrics as a function of the second past posting datum;
- generating, by the processor, a first score related to an expected value of the first posting as a function of the first predictive metrics and a second score related to the second posting as a function of the second predictive metrics, wherein generating the first score and the second score comprises:
  - training a machine learning model using training data and a machine learning algorithm, wherein the training data correlates previous posting metrics to scores;
  - outputting the first score using the trained machine learning model, wherein the first predictive metrics are provided to the trained machine learning model as an input to output the first score; and
  - outputting the second score using the trained machine learning model, wherein the second predictive metrics are provided to the trained machine learning model as an input to output the second score;
- displaying, by the processor, the first score and the second score to the originator
- prioritizing, by the processor, publishing of one of the first posting and the second posting based on a comparison of the first score and the second score; and
- publishing, by the processor, automatically, the prioritized posting when the score of the prioritized posting is within a predetermined threshold.

10. The method of claim 9, wherein each posting query comprises posting characteristics.

11. The method of claim 9, wherein each posting query specifies a time the originator seeks to fill a posting.

12. The method of claim 9, wherein each past posting datum comprises at least an accessed compared to applied rate.

13. The method of claim 9, wherein each past posting datum comprises at least a time to fill a role.

14. The method of claim 9, wherein the past postings are stored in a database.

15. The method of claim 9, wherein each score determines an efficiency for a posting.

16. The method of claim 9, wherein the predictive metrics are displayed using a graphic user interface.

17. The apparatus of claim 1, wherein the predicted metrics and the scores are displayed on a graphical user device, wherein displaying the predicted metrics and the scores comprises:
- displaying a first quantitative value for a number of forecasted views of each of the postings;
- displaying a second quantitative value for a number of forecasted responses to each of the postings; and
- displaying a third quantitative value for a forecasted time to fill a position associated with each of the postings.

18. The apparatus of claim 17, wherein displaying the scores further comprises displaying the scores in a color-coded format as a function of a cost-efficiency associated with each of the postings.

19. The method of claim 9, wherein the predicted metrics and the scores are displayed on a graphical user device, wherein displaying the predicted metrics and the scores comprises:
- displaying a first quantitative value for a number of forecasted views of each of the postings;
- displaying a second quantitative value for a number of forecasted responses to each of the postings; and
- displaying a third quantitative value for a forecasted time to fill a position associated with each of the postings.

20. The method of claim 19, wherein displaying the scores further comprises displaying the scores in a color-coded format as a function of a cost-efficiency associated with each of the postings.

* * * * *